(12) United States Patent
Hammer

(10) Patent No.: US 10,709,279 B1
(45) Date of Patent: Jul. 14, 2020

(54) WINDOW TREATMENT HANGING APPARATUS

(71) Applicant: Muna Hammer, Lutz, FL (US)

(72) Inventor: Muna Hammer, Lutz, FL (US)

(*) Notice: Subject to any disclaimer, the term of this patent is extended or adjusted under 35 U.S.C. 154(b) by 240 days.

(21) Appl. No.: 16/010,493

(22) Filed: Jun. 17, 2018

(51) Int. Cl.
*A47H 1/142* (2006.01)
*G01C 9/28* (2006.01)

(52) U.S. Cl.
CPC ............... *A47H 1/142* (2013.01); *G01C 9/28* (2013.01)

(58) Field of Classification Search
CPC .................................. A47H 1/142; A47H 1/102
USPC .......... 33/613, 333, 334, 370, 371; 248/251, 248/475.1; 160/368.1, 369, 330; 211/106.01, 87.01; D8/391, 388, 380, D8/367, 363, 354
See application file for complete search history.

(56) References Cited

U.S. PATENT DOCUMENTS

| | | | | |
|---|---|---|---|---|
| 673,412 A * | 5/1901 | Baker | ..................... | A47H 1/142 248/262 |
| 953,912 A * | 4/1910 | Laun | ..................... | A47H 1/142 248/262 |
| 4,372,450 A * | 2/1983 | Licari | ................. | A47G 25/0678 211/106.01 |
| 6,227,506 B1 * | 5/2001 | Benedict | ................. | A47B 96/06 211/90.01 |
| 6,357,716 B1 * | 3/2002 | Kratish | ................... | A47G 1/205 248/466 |
| 8,672,286 B2 * | 3/2014 | Darre | ..................... | A47G 1/164 248/476 |
| 8,739,423 B1 * | 6/2014 | Cortum | .................... | G01C 9/28 33/374 |
| 2005/0016697 A1 * | 1/2005 | Griggs | ................... | A47H 1/102 160/330 |
| 2006/0101661 A1 * | 5/2006 | Schmidt | ................. | A47G 1/205 33/613 |
| 2009/0139943 A1 * | 6/2009 | Fernandez | ............. | A47B 45/00 211/94.01 |
| 2009/0308995 A1 * | 12/2009 | Kuo | ....................... | A47K 10/10 248/231.91 |
| 2013/0333233 A1 * | 12/2013 | Esposito | .................. | A47G 1/16 33/370 |
| 2016/0255981 A1 * | 9/2016 | Rae | ........................ | A47H 1/142 |

* cited by examiner

*Primary Examiner* — Christopher W Fulton
(74) *Attorney, Agent, or Firm* — Gulf Coast Intellectual Property Group

(57) ABSTRACT

A window treatment hanging apparatus configured to be mounted and secure a drapery adjacent a window frame into conventional drywall utilizing only finish nails. The window treatment hanging apparatus includes a body having a central portion with a first end member and a second end member contiguously formed therewith at opposing ends thereof. The first end member and the second end member have upper portions that extend beyond the upper edge of the central portion. Channels are formed in the first end member and the second end member and are configured to receive a fastener therethrough. A pair of mounting brackets are secured to the front surface of the body and are configured to receive and retain drapery rods. The height of the first end member and second end member in the preferred embodiment of the window treatment hanging apparatus is twice that of the height of the central portion.

12 Claims, 3 Drawing Sheets

WINDOW TREATMENT HANGING APPARATUS

FIELD OF THE INVENTION

The present invention relates generally to interior decoration, more specifically but not by way of limitation, a window treatment hanging apparatus that is operable to mount an item such as but not limited to a drape adjacent a window wherein the body of the present invention facilitates secure mounting thereof utilizing only nails.

BACKGROUND

Window treatments are well known in the art and are installed in both commercial and residential applications. Numerous types of window treatment exist and range from such items as curtains, blinds and drapes. Blinds are typically mounted within the frame of the window while items such as curtains and drapes are mounted adjacent the window frame and in some applications be configured to extend thereacross. Drapes are manufactured in numerous different sizes and are available in alternate materials. The process of mounting drapes can be a cumbersome challenge for many to ensure the drapes are mounted correctly and securely.

Conventional mounting techniques for drapes often include mounting brackets and rods wherein the mounting brackets are positioned on opposing sides of the window frame and are mechanically secured to the wall. The securing of the mounting brackets can often require special fasteners such as but not limited to wall anchors. The mounting brackets must be secured level with respect to each other, which can cause those with less mechanical inclination problems when attempting to complete the installation. Additionally, conventional drapery mounting system can require tools not available to individuals.

Accordingly, there is a need for a window treatment hanging apparatus that is configured to facilitate the hanging of drapes and the like adjacent a window frame wherein the mounting of the window treatment apparatus is accomplished utilizing conventional fasteners without the need for wall anchors.

SUMMARY OF THE INVENTION

It is the object of the present invention to provide a window treatment mounting apparatus that is configured to mount a window treatment such as but not limited to a drape adjacent a window frame of a structure.

Another object of the present invention is to provide a window treatment mounting apparatus operable to secure a window treatment that includes a body wherein the body includes a central portion.

A further object of the present invention is to provide a window treatment mounting apparatus configured to secure a window treatment adjacent a window frame wherein the body includes a first end and a second end that are contiguously formed with the central portion.

Still another object of the present invention is to provide a window treatment mounting apparatus operable to secure a window treatment wherein the first end and second end of the body have a height that is greater than the height of the central portion.

An additional object of the present invention is to provide a window treatment mounting apparatus configured to secure a window treatment that further includes a first channel wherein the first channel is journaled angularly through the upper portion of the first end of the body.

Yet a further object of the present invention is to provide a window treatment mounting apparatus operable to mount a drape adjacent a window frame wherein the body includes a second channel that is bored angularly through the upper portion of the second end of the body.

Another object of the present invention is to provide a window treatment mounting apparatus configured to secure a window treatment wherein the body has mounting brackets secured proximate the first end and second end wherein the mounting brackets extend outward from the body.

Still an additional object of the present invention is to provide a window treatment mounting apparatus operable to mount a drape adjacent a window frame that further includes chemical adhesive pads wherein the chemical adhesive pads are secure to the upper portions of the first end and second end of the body.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
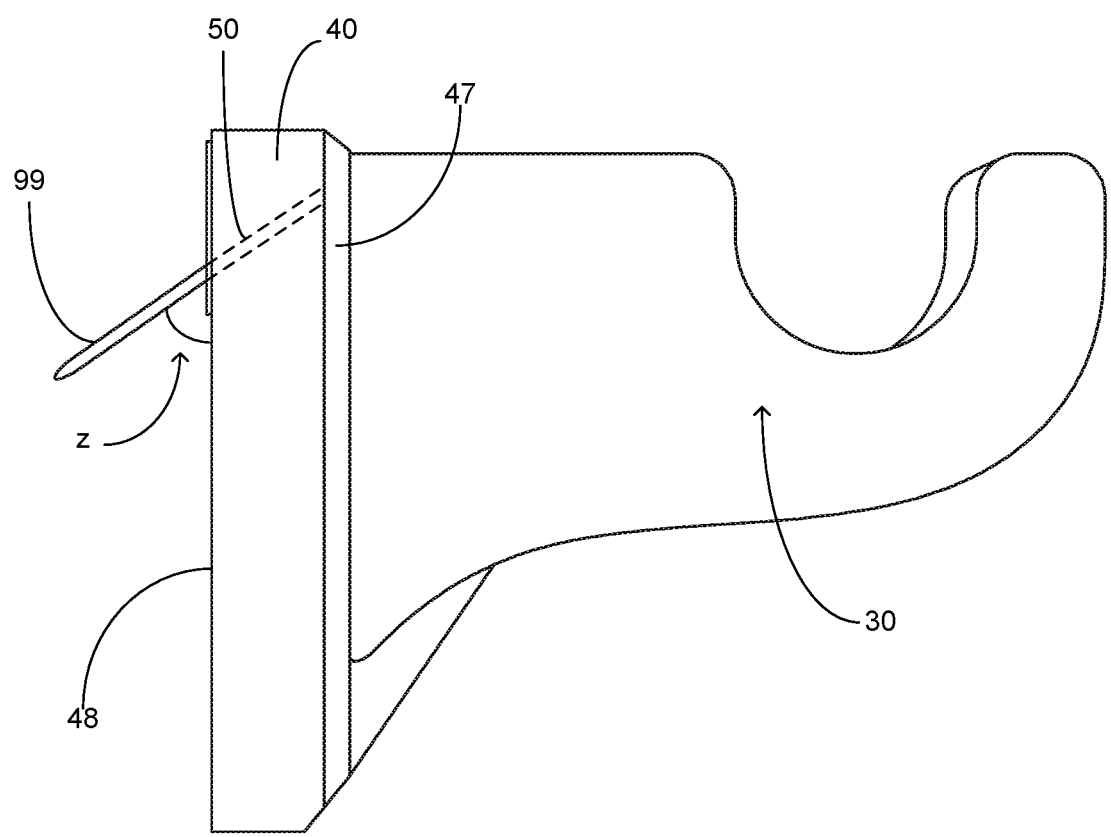
FIG. 1 is a side view of the present invention.
Figure 2:
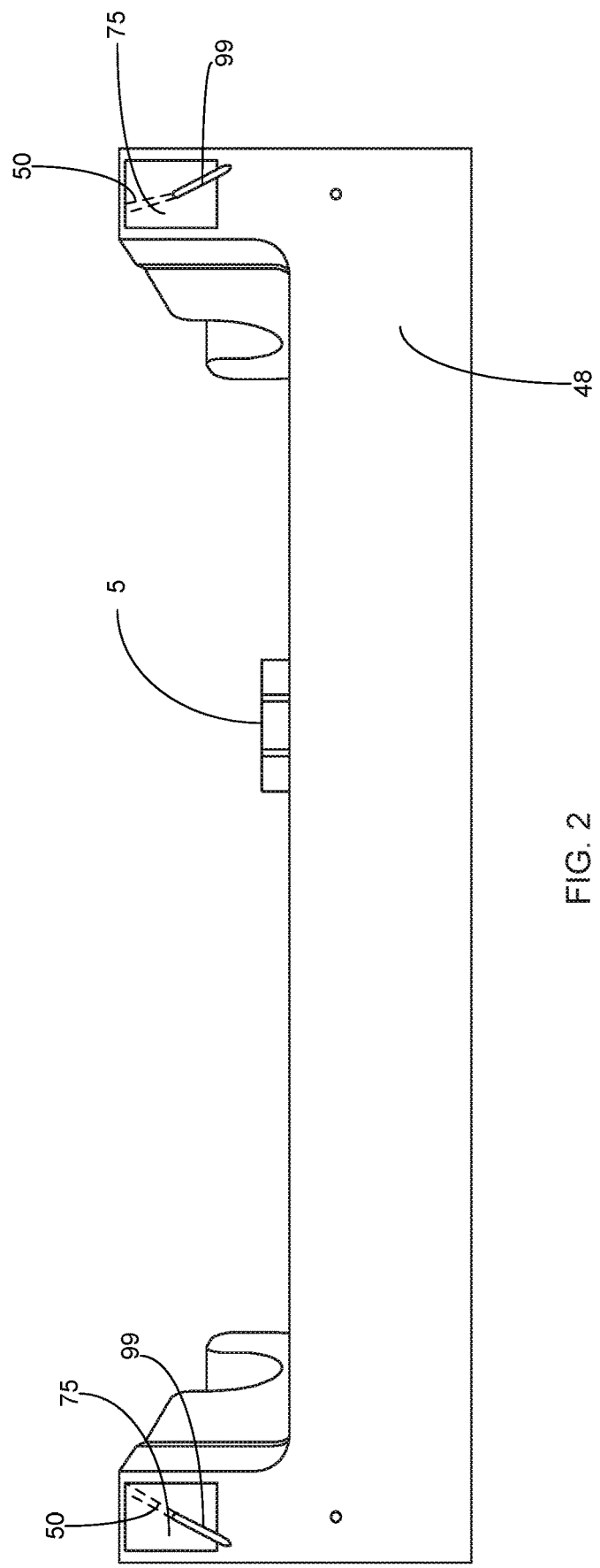
FIG. 2 is a front perspective view of the present invention.
Figure 3:
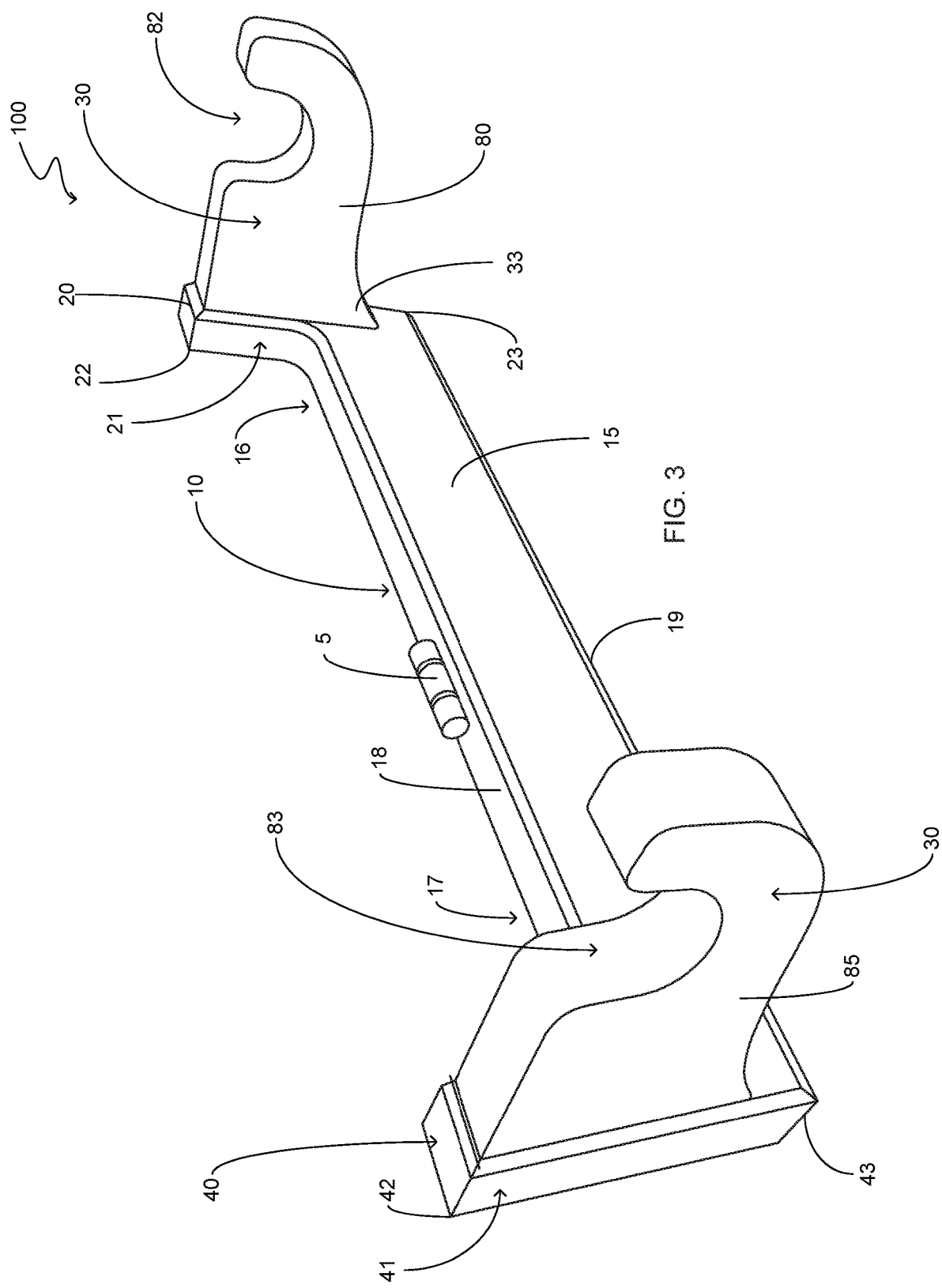
FIG. 3 is a rear view of the present invention.

Referring now to the drawings submitted herewith, wherein various elements depicted therein are not necessarily drawn to scale and wherein through the views and figures like elements are referenced with identical reference numerals, there is illustrated a window treatment hanging apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, window treatment hanging apparatus 100 includes body 10. The body 10 is manufactured from a rigid lightweight material such as but not limited to plastic or wood. The body 10 includes a central portion 15 that includes first end 16 and second end 17. The central portion 15 includes upper edge 18 and lower edge 19. The central portion 15 is rectangular in shape and the upper edge 18 is more proximate the lower end 33 of the mounting brackets 30. The central portion 15 is formed as described herein to deliver two primary functions. First, the overall weight of the window treatment hanging apparatus 100 is ideally less than a pound in order to securely mount the window treatment hanging apparatus 100 to conventional drywall as further described herein and retain the ability to receive drapery and hardware within the range of four to six pounds. Forming the central portion 15 as described herein reduces the weight of the body 10. Second, the lower position of the upper edge 18 allows the upper edge 18 to be substantially hidden by a drape engaged with the window treatment hanging apparatus 100 so as to provide improved aesthetics. While the central portion 15 is illustrated herein as being rectangular in shape, it is contemplated within the scope of the present invention that the central portion 15 could be formed in alternate shapes and sizes.

Contiguously formed with the body 10 proximate the first end 16 thereof is first end member 20. The first end member 20 includes an upper portion 21 that extends upward from the upper edge 18 of the central portion 15. The first end member 20 has a height that is twice that of the central portion 15. More specifically, from upper edge 22 to lower edge 23 the height is twice that of the height from the upper edge 18 to the lower edge 19. The first end member 20 has the aforementioned height characteristic in order to provide the required amount of leverage for the successful mounting of the window treatment hanging apparatus 100. While in the preferred embodiment, the first end member 20 has a height that is twice that of the central portion 15, it is contemplated within the scope of the present invention that the first end member 20 could have a height that is approximately one and a half to three times the central portion 15 and still achieve the desired function as described herein.

Similarly to the first end member, the second end member 40 is contiguously formed with the body 10 proximate the second end 17 thereof. The second end member 40 includes an upper portion 41 that extends upward from the upper edge 18 of the central portion 15. The second end member 40 has a height that is twice that of the central portion 15. More specifically, from upper edge 42 to lower edge 43 the height is twice that of the height from the upper edge 18 of the central portion to the lower edge 19 of the central portion 15. The second end member 40 has the aforementioned height characteristic in order to provide the required amount of leverage for the successful mounting of the window treatment hanging apparatus 100. The first end member 20 and the second end member 40 are formed having identical heights within the measurements discussed herein. The height of the first end member 20 and second end member 40 combined with the angle of the fastener 99 journaled through channel 50 combine to provide the required leverage to securely mount the window treatment hanging apparatus 100 and retain a drape with hardware weighing within the range of four to six pounds on a conventional piece of drywall without the requirement for additional mounting hardware.

A channel 50 is formed within the first end member 20 and second end member 40. For illustration purposes, the channel 50 is only illustrated in FIG. 1 herein in the second end member 40. The channel 50 is hollow and extends intermediate the front surface 47 and the rear surface 48. Channel 50 is journaled through the first end member 20 and second end member 40 at an angle Z. Angle Z in the preferred embodiment is fifty two degrees. The combination of the aforementioned height range of the first end member 20 and second end member 40 in conjunction with the angle Z of the channel 50 places the fastener 99 at the desired angle to securely mount the window treatment hanging apparatus 100 and secure a drape and rod within the range of four to six pounds into conventional drywall without the requirement for additional mounting hardware. While in the preferred embodiment the angle of the channel 50 is fifty two degrees, it is contemplated within the scope of the present invention that the angle of the channel 50 could be formed within the range of forty five to fifty five degrees and still achieve the desired functionality as described herein. As previously mentioned herein, while the Figures submitted herewith illustrate a channel 50 in the second end member 40, an identical channel is formed in the first end member 20. It is the combination of the height of the first end member 20, second end member 40 and the angle of the channel 50 as described herein that provides the required leverage that enables the body 10 to be secured to conventional drywall utilizing only finish nails as the fastener 99 and support drapery within the range of four to six pounds.

Secured to the rear surface 48 of the body 10 are adhesive pads 75. The adhesive pads 75 are secured on the upper portion 41 of the second end member 40 and the upper portion 21 of the first end member 20. The adhesive pads 75 have superposed thereon a conventional adhesive such as but not limited to pressure sensitive adhesive and are present to assist in the positioning of the window treatment hanging apparatus 100 prior to utilizing fastener 99 to secure the window treatment hanging apparatus 100 to drywall in a desired location adjacent a window frame. It is contemplated within the scope of the present invention that the adhesive pads 75 could be provided in alternate sizes so as to cover more of the rear surface 48 of the body 10. While two adhesive pads 75 are illustrated and discussed herein, it is contemplated within the scope of the present invention that the body 10 could have just one adhesive pad 75 secured to the rear surface 48 or utilize more than two adhesive pads 75.

The window treatment hanging apparatus 100 further includes a first mounting bracket 80 and a second mounting bracket 85. The first mounting bracket 80 is secured to the body 10 utilizing suitable durable techniques and is proximate the first end member 20. The second mounting bracket 85 is secured to the body 10 proximate the second end member 40. Both the first mounting bracket 80 and a second mounting bracket 85 extend outward from the body 10 and are perpendicular thereto. The first mounting bracket 80 and a second mounting bracket 85 further include notches 82,83 respectively and are formed so as to releasably secure therein a drapery rod. It should be understood within the scope of the present invention that the first mounting bracket 80 and a second mounting bracket 85 could be formed in alternate shapes and sizes.

Secured to the upper edge 18 is a level 5. Level 5 is a conventional bubble level that is utilized to provide visual verification that the window treatment hanging apparatus 100 is oriented in the proper level horizontal position prior to journaling the fasteners 99 into drywall. It is contemplated within the scope of the present invention that the level 5 is releasably secured to the upper edge 18 so as to provide removal thereof subsequent installation of the window treatment hanging apparatus 100. It is further contemplated within the scope of the present invention that the fastener 99 is a conventional finish nail of appropriate length and gauge. Good results have been achieved by utilizing a nail that is two and a half inches in length.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A window treatment hanging apparatus comprising:
   a body, said body having a central portion, said central portion having an upper edge and a lower edge with a height therebetween, said body having a front surface and a rear surface, said central portion having a first end, said central portion having a second end;
   a first end member, said first end member being contiguously formed with said first end of said central portion, said first end member having an upper portion, said upper portion of said first end member extending upward beyond the upper edge of the central portion, said first end member having a defined height;
   a second end member, said second end member being contiguously formed with said second end of said central portion, said second end member having an upper portion, said upper portion of said second end member extending upward beyond the upper edge of the central portion, said second end member having a defined height, wherein the height of the first end member and the second end member is one and a half to three times greater than the height of the central portion;
   a first channel and a second channel, said first channel being formed in the upper portion of said first end member, said second channel being formed in the upper portion of said second end member, said first channel and said second channel being hollow and extending intermediate the front surface and the rear surface of said body, said first channel and said second channel configured to receive a fastener therethrough, wherein the first channel and second channel are formed in the first end member and second end member respectively at an angle within the range of forty-five to fifty-five degrees; and
   a pair of mounting brackets, said pair of mounting brackets being secured to the front surface of said body, said pair of mounting brackets extending outward from said body and being perpendicular thereto.

2. The window treatment hanging apparatus as recited in claim 1, and further including at least one adhesive pad, said at least one adhesive pad being secured to the rear surface of said body.

3. The window treatment hanging apparatus as recited in claim 2, and further including a level, said level being releasably secured to said upper edge of said central portion.

4. The window treatment hanging apparatus as recited in claim 3, wherein said body of the window treatment hanging apparatus weighs less than one pound.

5. A window treatment hanging apparatus configured to be placed adjacent a window frame and secure a window treatment thereon comprising:
   a body, said body having a central portion, said central portion having an upper edge and a lower edge with a height therebetween, said body having a front surface and a rear surface, said central portion having a first end, said central portion having a second end, said central portion being rectangular in shape;
   a first end member, said first end member being contiguously formed with said first end of said central portion, said first end member having an upper portion, said upper portion of said first end member extending upward beyond the upper edge of the central portion;
   a second end member, said second end member being contiguously formed with said second end of said central portion, said second end member having an upper portion, said upper portion of said second end member extending upward beyond the upper edge of the central portion;
   a first channel and a second channel, said first channel being formed in the upper portion of said first end member, said second channel being formed in the upper portion of said second end member, said first channel and said second channel being hollow and extending intermediate the front surface and the rear surface of said body, said first channel and said second channel configured to receive a fastener therethrough, said first channel and said second channel being formed at an angle in said body between forty-five and fifty five degrees; and
   a pair of mounting brackets, said pair of mounting brackets being secured to the front surface of said body, said pair of mounting brackets extending outward from said body and being perpendicular thereto.

6. The window treatment hanging apparatus as recited in claim 5, wherein the height of the first end member and the height of the second end member is two times greater than the height of the central portion.

7. The window treatment hanging apparatus as recited in claim 6, wherein said body of the window treatment hanging apparatus weighs less than one pound.

8. The window treatment hanging apparatus as recited in claim 7, and further including at least one adhesive pad, said at least one adhesive pad being secured to the rear surface of said body.

9. A window treatment hanging apparatus configured to be placed adjacent a window frame and secure a window treatment thereon comprising:
- a body, said body having a central portion, said central portion having an upper edge and a lower edge with a height therebetween, said body having a front surface and a rear surface, said central portion having a first end, said central portion having a second end, said central portion being rectangular in shape;
- at least one adhesive pad, said at least one adhesive pad being secured to the rear surface of said body;
- a first end member, said first end member being contiguously formed with said first end of said central portion, said first end member having an upper portion, said upper portion of said first end member extending upward beyond the upper edge of the central portion;
- a second end member, said second end member being contiguously formed with said second end of said central portion, said second end member having an upper portion, said upper portion of said second end member extending upward beyond the upper edge of the central portion;
- a first channel and a second channel, said first channel being formed in the upper portion of said first end member, said second channel being formed in the upper portion of said second end member, said first channel and said second channel being hollow and extending intermediate the front surface and the rear surface of said body, said first channel and said second channel configured to receive a fastener therethrough, said first channel and said second channel being formed at an angle in said body between forty-five and fifty five degrees;
- a pair of mounting brackets, said pair of mounting brackets being secured to the front surface of said body, said pair of mounting brackets extending outward from said body and being perpendicular thereto; and
- wherein the height of the first end member and the height of the second end member is two times greater than the height of the central portion.

10. The window treatment hanging apparatus as recited in claim 9, wherein the height of the first end member and the height of the second end member is two times greater than the height of the central portion.

11. The window treatment hanging apparatus as recited in claim 10, and further including a level, said level being releasably secured to said upper edge of said central portion.

12. The window treatment hanging apparatus as recited in claim 11, wherein the window treatment hanging apparatus is capable of supporting drapery weighing within the range of four to six pounds.

\* \* \* \* \*